United States Patent [19]

Unger

[11] Patent Number: 5,122,019
[45] Date of Patent: Jun. 16, 1992

[54] WALL COVERING INSTALLATION SYSTEM

[76] Inventor: Douglas Unger, 25 White Oak La., Southampton, N.Y. 11968

[21] Appl. No.: 637,597

[22] Filed: Jan. 3, 1991

[51] Int. Cl.⁵ .............................................. F16B 39/00
[52] U.S. Cl. ..................................... 411/107; 411/38; 411/337; 411/340; 411/999
[58] Field of Search ............... 411/107, 999, 103, 520, 411/521, 132, 337, 371, 372, 368, 378, 387, 352, 353, 34, 37, 38, 340, 344, 345

[56] References Cited

U.S. PATENT DOCUMENTS

| | | |
|---|---|---|
| 1,251,676 | 1/1918 | McCaffray . |
| 1,788,481 | 1/1931 | Brostrom . |
| 1,849,604 | 3/1932 | Weatherhead, Jr. ............ 411/521 X |
| 2,385,381 | 9/1945 | Samiran .......................... 411/223 X |
| 2,470,927 | 5/1949 | Hale, Jr. ........................ 411/924 X |
| 2,492,115 | 12/1949 | Crowther ....................... 411/999 X |
| 2,581,288 | 1/1952 | Pletcher, Jr. .................... 411/520 |
| 2,709,470 | 5/1955 | Knohl ............................. 411/999 X |
| 2,795,130 | 6/1957 | Pritchett . |
| 2,929,474 | 3/1960 | Boardman . |
| 3,502,130 | 3/1970 | Gulistan ......................... 411/999 X |
| 3,511,001 | 5/1970 | Morgan, Jr. ...................... 52/126 |
| 3,892,031 | 7/1975 | Bisbing ............................. 411/372 X |
| 4,238,987 | 12/1980 | Siebrecht-Reuter ................... 85/83 |
| 4,486,134 | 12/1984 | White ................................. 411/103 |
| 4,655,656 | 4/1987 | Jonsson ............................. 411/337 |
| 4,662,807 | 5/1987 | Lien et al. ......................... 411/368 |
| 4,834,602 | 5/1989 | Takasaki ............................ 411/386 |
| 4,874,278 | 10/1989 | Kawashita ......................... 411/386 |
| 4,957,449 | 9/1990 | Hatagishi ......................... 403/22 X |
| 4,995,274 | 2/1991 | Kleeman ........................... 411/13 |

FOREIGN PATENT DOCUMENTS

| | | | |
|---|---|---|---|
| 1215445 | 4/1966 | Fed. Rep. of Germany ...... 411/347 |
| 1454288 | 9/1966 | France ............................. 411/337 |
| 556758 | 10/1943 | United Kingdom ............... 411/371 |

Primary Examiner—Rodney M. Lindsey
Attorney, Agent, or Firm—Darby & Darby

[57] ABSTRACT

The invention relates to a system for mounting a flat wall covering on an uneven existing surface or studs. A screw is provided with a threaded portion and a non-threaded portion near the head. At one end of the threaded portion is a flat annular plateau, perpendicular to the axis of the screw. A support nut, with an attached bearing surface, is threaded onto the screw, up to the flat plateau, at which point the bearing surface will contact the wall covering. The screw can then be rotated without axial displacement of the support nut or the wall covering with respect to the screw. However, the screw and the wall covering will move axially with respect to the existing surface. A plurality of these devices can be used and adjusted independently to create a flat surface.

7 Claims, 2 Drawing Sheets

WALL COVERING INSTALLATION SYSTEM

BACKGROUND OF THE INVENTION

This invention relates to a device for adjustably mounting a wall covering, such as shim slats or drywall to an uneven wall surface or uneven studs to create a flat surface. An example use for this invention is in the application of bathroom tile, where a flat base surface must be created before the tile can be applied. The invention includes a screw means, provided with an annular plateau perpendicular to the axis of the screw, upon which rests a support means for supporting the wall covering.

Devices are known in the art for adjustably fastening items, such as window and door frames, to fixed elements, e.g., U.S. Pat. No. 4,486,134 and U.S. Pat. No. 4,655,656. By these known devices, a screw is provided with an unthreaded area near the head, around which is positioned a sleeve having external threads for engaging the frame.

U.S. Pat. No. 4,655,656 discloses a combination of a sleeve and a screw where the sleeve is driven into a pre-bored hole in the frame. The screw is then inserted through the sleeve, through the hole and into the fixed element. When the bottom surface of the screw head and the top surface of the sleeve contact, they engage each other, allowing for the screw and the sleeve to be driven clockwise simultaneously. Once the sleeve is flush with the frame, the screw can be rotated counter-clockwise without turning the sleeve, allowing for adjustment of the spacing between the frame and the fixed element.

U.S. Pat. No. 4,486,134 discloses a similar arrangement of the screw and sleeve, but has an embodiment where a split spring ring engages a slot in the screw to maintain the screw's axial position with respect to the frame, while allowing rotation and adjustment of the spacing between the frame and the fixed element. In both cases, a complex sleeve is necessary and it must be installed in the frame.

U.S. Pat. No. 1,788,481 discloses a screed jack for adjustably mounting a floor surface to a floor base. This device has a bearing surface for holding the floor surface in place, but lacks two features of the present invention. By merely using a flat piece of material as a bearing surface, there is no compensation for minor variations in the thickness of the floor covering. However, the floor covering is resting solely on top of the bearing surface, so this feature is unnecessary. There is also no way to determine if the jack is sufficiently mounted in the floor base. Both of these features are, however, important in installing wall coverings, as the weight forces act parallel to the wall surface.

SUMMARY OF THE INVENTION

It is an object of the invention to provide an improved means for adjustably mounting an even wall covering on an uneven fixed element.

It is a further object of the invention to provide a means for compensating for variations in the thickness of the wall covering.

It is a further object of the invention to provide a means for indicating a minimum safe depth for the screw to be inserted into the fixed element.

It is a further object of the invention to provide a simple, inexpensive means for adjustably mounting an even wall covering, constructed of common building materials.

In the invention, a screw is provided with a threaded portion and a non-threaded portion near the head. At the head end of the threaded portion is a flat annular plateau, perpendicular to the axis of the screw. A support nut, with an attached bearing surface, is threaded onto the screw, up to the flat plateau, at which point the bearing surface will contact the wall covering. The screw can then be rotated without axial displacement of the support nut or the wall covering with respect to the screw. The screw is also driven into the fixed element and can then be adjusted inward or outward. When more than one of these devices is used, they can be independently adjusted to create a flat surface or any shape surface, limited only by the shape of the fixed element and the pliability of the wall covering.

The foregoing and other objects and advantages of this invention will become apparent to those skilled in the art upon reading the detailed description of a preferred embodiment in conjunction with a review of the appended drawings.

DETAILED DESCRIPTION

Figure 1:
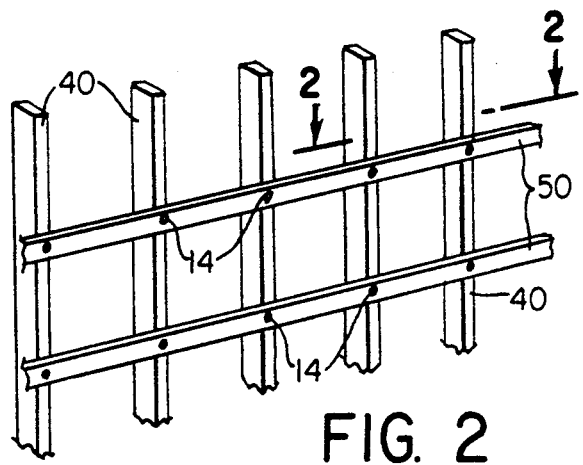
FIG. 1 is a perspective view of the preferred embodiment of the invention installed.
Figure 2:
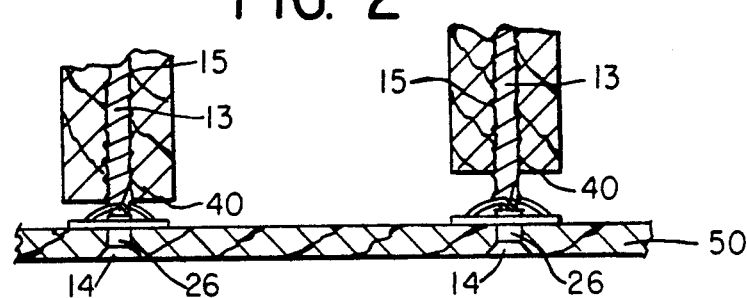
FIG. 2 is a cross-sectional view taken along the line 2—2 of FIG. 1, showing support screws connecting a wall covering to an uneven fixed element.
Figure 4:
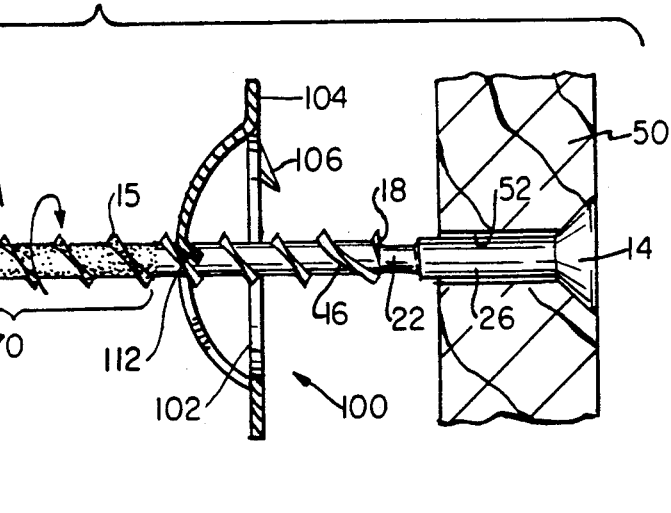
FIG. 4. is an enlarged side view of the preferred embodiment during assembly of the invention.
Figure 3:
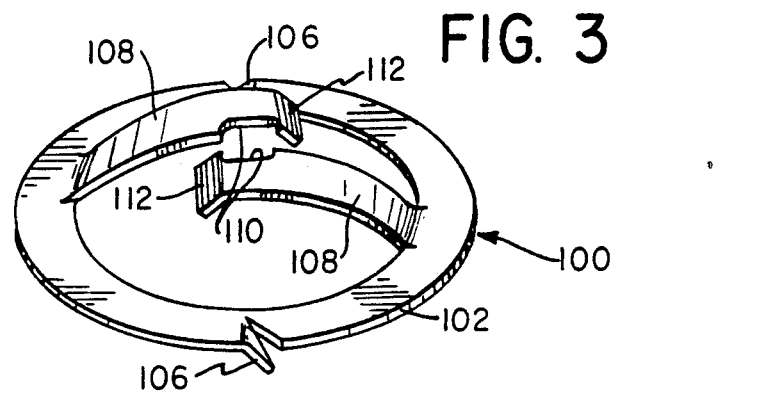
FIG. 3 is a perspective view of the preferred embodiment of the support nut.

In the preferred embodiment, the invention is used to mount a wall covering 50, comprised of a relatively thin wood strip to be used as a base for another covering material. In practice, a plurality of wood strips would be used. A support screw 10 has a point 12 at one end and a head 14 at the other. A body portion 13 of the screw 10 begins at the point 12 and has a spiral thread 15. The thread 15 has a greater pitch angle at its head end, forming a ramp thread 16. The ramp thread 16 leads to and ends at a bearing plateau 18. The higher pitch of the ramp thread 16 maximizes the surface area of the bearing plateau 18. The bearing plateau 18 is an annular surface with the same outer diameter as the thread 15 and is perpendicular to the axis of the screw 10. Adjacent to the plateau 18, is a non-threaded gap 22 with the same or slightly smaller diameter as the minor diameter of the thread 15. Above the non-threaded gap 22, a second portion 26 of the screw shank has no thread and has a diameter between the minor and major diameters of the thread 15. The length of the second portion 26 of the screw shank 13 is pre-determined by the thickness of the wall covering 50 that is to be mounted. The head 14 of the screw 10 is a common flat head screw for a flush final appearance, although other head configurations are similarly appropriate.

In the preferred embodiment of the invention as shown in FIGS. 1 through 6, a support nut 100 is preferably composed of spring steel and includes an annular body portion 102 have a bearing surface 104 facing the head 14 when on the screw 10. Angled toward the head 14 are two triangular tabs 106. Two arms 108 extend from the inner edge of the annular plate 102 toward the center and are parallel but offset from each other. The two arms 108 are convexly arced toward the point 12 when the support nut 100 is threaded on screw 10. Along the side of each arm 108 is a notch 110 at the area where the two arms 108 overlap and the notches 110 are positioned such that they face each other. The notches 110 are each shaped as one half of an elongated slot for reasons discussed below. The space between the notches 110 is large enough to receive the screw body 13 between them, but small enough to engage the thread 15. The distal end of each arm 108 is slightly angled toward the head 14, creating grip members 112. The grip members 112 of each arm 108 assist in threading the support nut 100 onto the thread 15 when the support nut 100 reaches the ramp thread 16.

A hole 52 is drilled in the wood strip 50 and is countersunk to accommodate the head 14 of the screw 10. The screw is inserted through the hole 52 and then through the notches 110 of the support nut 100 such that the bearing surface 104 faces the wood strip 50. The support nut 100 is then screwed down the thread 15. When the support nut 100 reaches the ramp thread 16, a grip member 112 will engage the ramp thread 16, forcing the support nut 100 onto the plateau 18. At this position, the tabs 106 will contact the wood strip 50 and the two arms 108 will contact the plateau. The two arms 108 will also be slightly compressed, biasing the bearing surface 104 against the wood strip 50. Compression of the two arms 108 will be variable depending on the thickness of the wood strip 50. The elongated shape of the notches 110 allows them to slide laterally with respect to the screw 10 during the compression, while the screw 10 maintains pivotable engagement with the notches 110. The screw 10 is now free to rotate within the hole 52 without axial displacement of the support nut 100. The whole assembly of wood strip/support nut/support screw is positioned with the point 12 facing the existing surface 40. The screw 10 can now be driven into the existing surface 40 by clockwise rotation of the screw 10. The wood strip 50 can then be precisely positioned with respect to the existing surface by subsequent clockwise or counterclockwise rotation of the screw 10. A depth indicator 70, preferably a colored zone of the screw 10, extending from the point 12, will be seen above the existing surface 40 if it is not sufficiently driven into the surface 40. This ensures the screw 10 can sufficiently support the wood strip 50 and any other wall covering to be mounted on top of the wood strip.

When the wall covering 50 is of such a size or shape that the rear of the covering 50 is inaccessible, such as when the wall covering 50 is a common sheet of drywall, another embodiment of the invention is used. A support nut 80 is positioned in place of a common nut at the end of a fastener, preferably of the type similar to a MOLLY ® brand hollow wall fastener, from here on called a molly bolt sleeve 82. The sleeve 82 has at its head end an annular plate 84 perpendicular to the axis of the sleeve 82 to accommodate a head 14 on the screw 10. Two grip tabs 86 are angled from the annular plate 84 toward the point end of sleeve 82. A collar portion 88 of the sleeve 82 has a length less than the thickness of the wall covering 50. Attached to the support nut 80 is a smaller collar portion 90. Spanning the two collar portions 88, 90 are a plurality of flexible locking arms 92.

Figure 5:
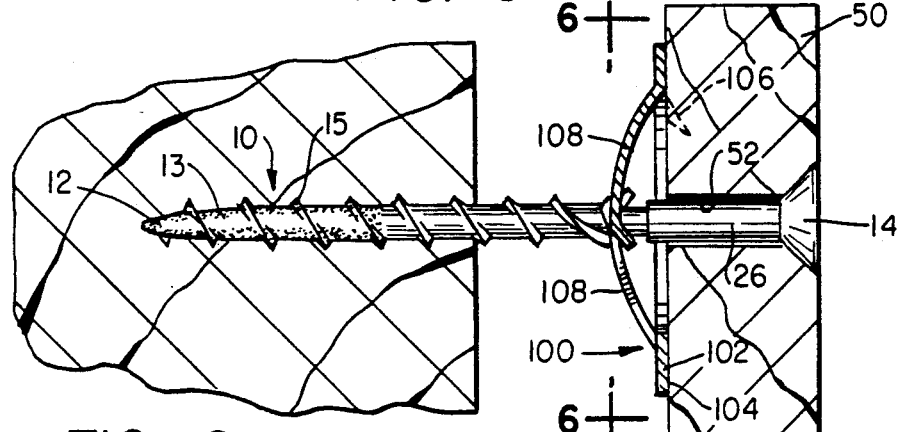
FIG. 5 is an enlarged side view of the invention in the assembled condition.
Figure 6:
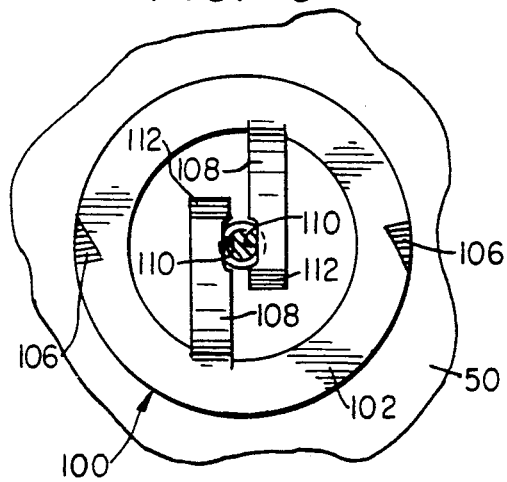
FIG. 6 is a section view taken along the line 6—6 of FIG. 5.
Figure 7:
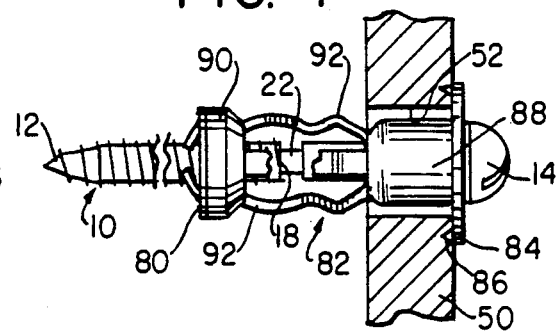
FIGS. 7 and 8 are side views of another embodiment of the invention before and after installation.
Figure 8:
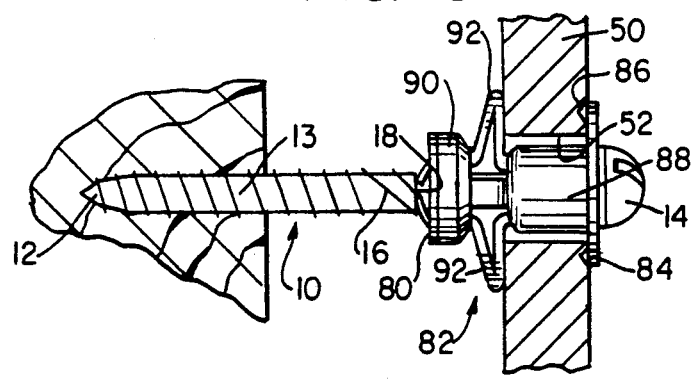

The installation of this embodiment can be seen in FIGS. 5 and 6. A hole 52 is drilled and countersunk in the wall covering 50 large enough to accommodate the screw 10 with the molly bolt sleeve 82 partially threaded on the screw 10. Once the molly bolt sleeve 82 has been inserted into the hole 52 and the grip tabs 86 have engaged the wall covering 50, the screw 10 is rotated clockwise. This causes the support nut 80 to ride along the thread 15 toward the head 14. As the smaller collar portion 90 moves toward the collar portion 88, the flexible locking arms 92 will bulge radially outward as shown in FIG. 6. By rotating the screw 10 clockwise, the screw 10 will also penetrate the existing surface 40. The support nut 80 will continue to ride up the thread 15, eventually reaching the non-threaded gap 22. At this point, a portion of the flexible locking arms 92 will contact the wall covering 50 and serve as a bearing surface, while the support nut 80 will rest on the plateau 18. The screw 10 is now free to rotate within the collar 88 without causing axial displacement of the support nut 80 or the wall covering 50 with respect to the screw 10. The distance between the wall covering 50 and the existing surface 40 can be precisely adjusted by clockwise or counterclockwise rotation of the screw 10, which causes the existing surface 40 to ride up or down the thread 15 of the screw 10.

It is also contemplated by the invention that a support nut, similar to the nut 100 of the preferred invention could be positioned in place of a common nut in a toggle bolt assembly. After usual installation of the toggle bolt assembly in drywall, the support nut will rest on the plateau of the screw, while the wings of the toggle bolt will contact the drywall and act as a bearing surface.

Other uses of the device include creating walls of a mold, where precision in the shape of the walls of the mold is needed. Curved surfaces, as well as angled surfaces, can all be accommodated by the invention.

While the embodiment of the invention shown and described is fully capable of achieving the results desired, it is to be understood that this embodiment has been shown and described for purposes of illustration only and not for purposes of limitation.

What is claimed is:

1. A device for evenly mounting a semi-pliable covering to a relatively rigid exiting surface, comprising:

a support screw having a head and a point, said screw also having a helical thread from said point to a position a first distance before said head, said screw having a bearing plateau at said position and a non-threaded gap adjacent to said plateau; and a means for supporting said covering, said means threadably engaging said support screw and subsequently resting at said gap against said plateau such that said covering is rigidly supported in spaced relationship from said surface between said means for supporting and said head of said support screw, and a portion of said screw with said thread is threadably engaged to said surface such that rotation of said screw causes axial displacement of said covering with respect to said surface; and wherein said support means comprises a plate for contacting said covering and a plurality of arms extending inward from said plate for engaging said thread; and wherein said arms are resilient and convexly arced, said arms also having elongated notches for engaging said thread, such that said arms allow for variations in the thickness of said covering.

2. A device for evenly mounting a semi-pliable covering to a relatively rigid exiting surface, comprising:

a support screw having a head and a point, said screw also having a helical thread from said point to a position a first distance before said head, said screw having a bearing plateau at said position and a non-threaded gap adjacent to said plateau; and a support means for threadably engaging said support screw and subsequently resting at said gap against said plateau such that said covering will be supported between said support means and said head of said support screw, and a portion of said screw with said thread will be threadably engaged to said surface such that rotation of the screw will cause axial displacement of said covering with respect to said surface, said thread having a greater pitch in an area immediately adjacent to said non-threaded gap compared to the remaining thread such that the surface area of said plateau is maximized.

3. A device as in claim 2 wherein said support means comprises a plate for contacting said covering and a plurality of arms extending inward from said plate for engaging said thread.

4. A device as in claim 3 wherein said arms are resilient and convexly arced, said arms also having elongated notches for engaging said thread, such that said arms allow for variations in the thickness of said covering.

5. A device as in claim 4 wherein said support means further comprises extended tabs to engage said covering when said support means rests on said plateau.

6. A device as in claim 2 wherein said support means comprises a support nut for engaging said thread, said nut attached to a molly bolt assembly having a plurality of expandable support bars for contacting said wall covering.

7. A device for evenly mounting a semi-pliable covering to a relatively rigid existing surface, comprising:

a support screw having a head and a point, said screw also having a helical thread from said point to a position a first distance before said head, said screw having a bearing plateau at said position and a non-threaded gap adjacent to said plateau; and a support means for threadably engaging said support screw and subsequently resting at said gap against said plateau such that said covering will be supported between said support means and said head of said support screw, and a portion of said screw with said thread will be threadably engaged to said surface such that rotation of the screw will cause axial displacement of said covering with respect to said surface, said support screw being colored in an area from said point to a position a second distance before said head, said second distance greater than said first distance, said area marking a minimum amount of said screw that must be engaged to said surface.

* * * * *